United States Patent [19]

Kim

[11] Patent Number: 4,622,266

[45] Date of Patent: Nov. 11, 1986

[54] MOLDABLE ELECTRICALLY CONDUCTIVE POLYMER COMPOSITIONS

[75] Inventor: Oh-Kil Kim, Burke, Va.

[73] Assignee: The United States of America as represented by the Secretary of the Navy, Washington, D.C.

[21] Appl. No.: 739,355

[22] Filed: May 30, 1985

[51] Int. Cl.$^4$ .......................... B32B 27/00; H01B 1/00

[52] U.S. Cl. .................................... 428/394; 428/372; 428/395; 252/500; 524/236; 264/104; 264/331.11; 264/331.15

[58] Field of Search ........................ 252/500; 524/236; 264/104, 331.11, 331.15; 428/394, 395, 372

[56] References Cited

U.S. PATENT DOCUMENTS 4,374,048 2/1983 Kim et al. ............................ 252/500
4,529,538 7/1985 Kim .................................... 252/500

*Primary Examiner*—Josephine L. Barr
*Attorney, Agent, or Firm*—Sol Sheinbein; Edward V. Hiskes

[57] ABSTRACT

A salt of 7,7,8,8-tetracyanoquinodimethane (TCNQ) and a structural polymer are dissolved in a mutual solvent. The solution is chilled and subsequently added to a liquid with which the solvent is miscible but in which the TCNQ and polymer are less soluble. A precipitate results which is a massive, conducting, moldable substance stable in atmospheric oxygen.

19 Claims, No Drawings

MOLDABLE ELECTRICALLY CONDUCTIVE POLYMER COMPOSITIONS

BACKGROUND OF THE INVENTION

The present invention pertains generally to electroactive materials and in particular to organic polymeric conductive materials.

TCNQ compositions are useful as conductors in both pure form and as an ingredient in compositions. However, pure TNCQ compounds are crystalline in nature and do not have desirable structural properties. When TCNQ is used an ingredient in a composition, an improvement in structural properties may be achieved. However, this improvement is generally at the expense of the desired conductivity.

In order to obtain a substance with the desirable electrical qualities of TCNQ and also improved structural properties, various compositions of TCNQ with polymers have been developed. However, these prior art compositions have had one or more of the following shortcomings: (1) they could be produced only in film, as opposed to bulk, moldable form; (2) the electrical properties of the TCNQ were adversely affected when combined with the polymer; (3) the composition was not stable against heat or atmospheric degradation.

For example, U.S. Pat. No. 3,966,987 describes a conductive TCNQ composition used to form the plates of a capacitor. But this composition could be used only in film, as opposed to moldable form. Other examples of film TCNQ compositions are found in U.S. Pat. Nos. 4,202,799; 3,828,008, and 3,835,102.

A moldable conductive polymer invention is disclosed in U.S. Pat. No. 3,448,177. However, the Patentee warns that the substances claimed are very susceptable to atmospheric degradation. Futhermore, the conductivities claimed are low compared to those of the crystalline TCNQ salt. Furthermore, the cation associated with the TCNQ radical-anion is built into the structural polymer. This limits the choice of cations to those which can be incorporated into the polymer itself. Furthermore, the method described for preparing the composition involves heating the TCNQ while it is in contact with the solvent. It has been discovered by the applicant that such heating is harmful because it causes side reactions that degrade the conductivity of TCNQ.

In some cases, moldable TCNQ compositions have been claimed as dielectric material in capacitors. For example, a composition of TCNQ and polymer is disclosed in U.S. Pat. No. 3,679,944 as a dielectric material, as opposed to a conductor. However, the TCNQ compositions in these cases suffer from problem (2) described above, in that normally conductive TCNQ is caused to be non-conductive in the composition. This is accomplished by "dispersing" the TCNQ throughout the polymer bulk so that the typical electrical conductivity of TCNQ cannot manifest itself. The polymer insulates the conductive TCNQ molecules from one another. If the goal is to make a dielectric i.e., an insulating material, this is desirable. If the goal is to make a conductive polymeric material, this change in the normal conductivity of the TCNQ is exactly the opposite of what is needed.

OBJECTS OF THE INVENTION

Accordingly, it is an object of this invention to obtain high electrical conductivity in a polymeric composition.

Another object is to provide a bulky, moldable polymeric composition that conducts electricity.

Another object is to provide a polymeric compositon that is stable in an oxygen-rich atmosphere.

Another object is to de-couple the choice of structural polymer from the choice of cation so as to allow optimization of composition properties and choice of the most economical materials.

Another object is to provide a means for improving the normal structure properties of TCNQ while retaining the desirable thermal or electrical properties of any given TCNQ/salt species.

Briefly, the above and other objects are achieved by the present inventive method and material. A salt of 7,7,8,8-tetracyanoquinodimethane (TCNQ) and a structural polymer are dissolved in a mutual solvent. The solution is chilled and subsequently added to a liquid with which the solvent is miscible but in which the TCNQ and polymer are less soluble. A precipitate results which is a massive, conducting, moldable substance stable in atmospheric oxygen. It consists of polymer filaments coated with TCNQ microcrystals. These filiments retain many properties of the pure, crystalline TCNQ salt.

DETAILED DESCRIPTION OF THE INVENTION

Previous TCNQ-polymer compositions have employed film casting techniques or have otherwise involved prolonged contact of the TCNQ salt with a solvent. However, it has been discovered that prolonged solvent contact, as happens when a film is being cast, degrades the conductivity of TCNQ. Conductivity loss is also caused when heat is applied to TCNQ in solution during a film-casting process.

The greatly enhanced conductivity of polymer compositions produced in accordance with the present invention arises due to rapid mixing and precipitation of the TCNQ and the framework polymer. In contrast to the composition described in U.S. Pat. No. 3,448,177, there is no heating of the TCNQ while it is in contact with solvent. It has been discovered by the present inventor that heating such as this acts to degrade rapidly the conductive properties of the TCNQ. Furthermore, in film casting techniques, the solvent is in contact with the TCNQ for a lengthy period of time while the solution is being evaporated to form the film. The TCNQ is also exposed to dissolved polymer for this lengthy period. Thus, there is time for the solvent to degrade the TCNQ, and also time for the TCNQ to form undesired complexes with the polymer rather than the intended cation. However, rapid, low temperature precipitation, as taught in present invention, prevents both of these undesirable side effects.

If the product of this invention is microscopically examined, it will present a filamentous appearance. Filaments of the structural polymer are coated with microcrystalline TCNQ. Since the filaments are coated with conductive TCNQ crystals and since the filaments are in intimate contact with one another, in the case of conductive TCNQ salts, conductive paths will be formed in all directions throughout the bulk material. Furthermore, since the TCNQ microcrystals are, for the most part, in the same chemical state as pure, crystalline TCNQ, the bulk composition will have a conductivity of the same order of magnitude as the pure TCNQ substance. Specifically, it may be expected that the conductivity will be at least one-third to one-half as high as the pure TCNQ-cation species chosen. The conductivity per unit of TCNQ present is approximately the same in the composition as in the pure crystal.

A wide variety of polymers may be used in this invention. However, polymers that are electron donors, but not very strong donors, work the best. It appears that a weakly electron donating polymer filament will attract TCNQ species to its surface, thus causing an even, thorough coating of TCNQ/cation to form. This coating, adhering due to bonds formed between TCNQ and the weakly donated polymer electrons, is a firm foundation upon which TCNQ microcrystals may grow. However, since the tendency to transfer an electron to TCNQ is weak, the electron will remain associated primarily with the polymer, rather than with the TCNQ/cation. Thus, the normal properties of the TCNQ are not greatly affected by the presence of the polymer. TCNQ located in those portions of the microcrystals not in immediate contact with the polymer filaments is probably not affected at all by the presence of the polymer.

Strong electron donor polymers tend to associate too tightly with the TCNQ, thus inhibiting microcrystallization. This happens because a strong electron donating polymer will compete with the cation of the TCNQ salt in forming an ionic bond with TCNQ. If this competition by the polymer is too successful, dissolved TCNQ salt will not be available to form microcrystals with the desired cation when precipitation occurs.

On the other hand, polymers that do not donate electrons will not compete for the cation at all. Thus, the cation TCNQ species will not be attracted to the surface of the polymer filament, and a stable, electronically anchored coating of TCNQ will not be formed on the filaments. In this case, the TCNQ may not microcrystallize on the polymer in the desired, filamentous, conductive pattern. Rather, a non-filamentous pattern of TCNQ crystals may result, with matrix polymer blocking the conductive pathways.

Thus, there is an upper limit and a lower limit of electron donation strength that is preferable in the structural polymer of this composition. Typically, the preferred polymers for this invention have an ionization potential of about 8–12 eV, preferably about 9–11 eV, and most preferably about 9–10 eV. In order of decreasing preference, some typical polymers that may be employed in this invention are polycarbonate (PC); poly(vinyl butyral) P(BA); and poly(methyl methacrylate) (PMMA). Of course, other matrix polymers such as polyethers, polyamides, polyimides and polyesters having ionization potentials in about the same range as the polymers cited above should be usable as well.

To make the preferred embodiment of this invention, a polymer (preferably a weak electron donor), a simple or complex TCNQ salt and, optionally, neutral TCNQ, are dissolved in an appropriate solvent to form a solution. The solution is chilled, and then poured into a second, miscible liquid. This liquid is chosen to have lower solubility for TCNQ and the polymer. The resulting precipitate is filtered out and dried. This is the desired composition. When molded under pressure, it exhibits good mechanical strength.

The chilling step described in the previous paragraph could be omitted if desired. However, the additional retained heat causes the temperature of the second, miscible liquid to be higher. This reduces the yield of precipitate since the higher temperature solution is able to keep more solute in solution.

In this description, and the claims which follow, the term TCNQ salt refers generically to both the complex and simple salts of TCNQ, and substituted TCNQs unless otherwise stated. The anion of a complex salt is simply a complex of neutral TCNQ and $TCNQ^-$, the simple radical anion. Thus, a solution of the simple salt may be converted to a solution of the complex salt merely by the addition of neutral TCNQ.

Any solvent in which both the TCNQ salt and the chosen polymer are mutually soluble may be used in preparing this invention. Usable solvents include dimethylformamide (DMF) and dimethylsulfoxide (DMSO). Other possible solvents include, but are not limited to, N,N-dimethylacetamide, acetonitrile, tetrahydrofuran, and methylene chloride.

It has been found that the addition of neutral TCNQ will enhance conductivity to some extent. However, the addition of neutral TCNQ, while helpful, does not make a dramatic difference. This is in sharp contrast to the situation with conductive film compositions of TCNQ wherein addition of neutral TCNQ can change the order of magnitude of the resistivity.

Electrical conductivities achieved with this invention are of the same order as those of the incorporated TCNQ salt. This invention is a composition containing a framework polymer and filaments of TCNQ microcrystals collected on and around the strand of the framework polymer. When electrons flow through the composition, they flow through the abutting TCNQ microcrystals in each filament. The mode of conduction is the same as would occur in a sample of pure, polycrystalline TCNQ salt. Thus, it is found that the conductivity of samples of this invention falls within the same order of magnitude as pure TCNQ salt. Theory suggests that the proportion of conductivity displayed by the composition vis a vis the TCNQ salt is the weight of TCNQ salt in the compositon over the total weight of the TCNQ salt plus non-conductive framework polymer.

Since electrons are conducted from one TCNQ microcrystal to another within this composition, the mode of electron conduction is identical to that which exists when a pure sample of TCNQ is used as a conductor. The polymer matrix acts as a framework and anchor for adjacent TCNQ microcrystals, but is not otherwise involved in the conduction process. Since the polymer is a mere structural support for otherwise unchanged TCNQ salts, it may be generally expected that any species, complex or simple, of TCNQ salt, or substituted-TCNQ salt, will operate in this invention. It is expected that these will conduct, in proportion, as the pure TCNQ salt conducts, to within an order of magnitude.

It is necessary to use a reasonable amount of TCNQ and cation relative to the amount of framework polymer that is used. Enough conductive material must be used to provide material for coating the filaments with microcrystals to an adequate thickness throughout the composition. However, if too much TCNQ conductive material is used, the strength of the composite may be reduced due to lack of enough structural fiber. The correct amount of TCNQ salt may be determined by examining samples of the precipitate under a microscope. A correctly proportioned mixture will produce a filamentous polymer product with each filament evenly covered with TCNQ salt microcrystals.

It has been found with N-methylphenazinium TCNQ salt and bis-phenol A polycarbonate polymer that a weight ratio of 103 parts polymer to 116 parts neutral TCNQ and 192 parts NMP+ TCNQ− salt provides a composite with good properties for conductivity and overall mechanical strength. Obviously, if a polymer of heavier molecular weight is chosen, the number of parts of polymer can be adjected upward in proportion to the increase in molecular weight of monomer bisphenol A to the monomer of the substitute polymer. The same type of adjustment can be made if a lighter or heavier cation is associated with the TCNQ, or if a substituted TCNQ of different weight is used.

EXAMPLES

EXAMPLE I

Twelve ml of N,N-dimethylformaldehyde (DMF) was used to dissolve 0.10 g polycarbonate (PC) at 30° C. and 0.30 g $NMP^+$ $TCNQ^-$. The resulting dark green solution was chilled over crushed dry ice for a few minutes with intermittent stirring until microcrystals deposited. The mixture was then quickly treated with a large excess of cold acetonitrile. A black composite precipitate formed. This was filtered off and dried at 35° C. in vacuo 2 days. A compaction disk sample of this composite gave a conductivity of 0.46 $ohm^{-1}$ $cm^{-1}$. This example was duplicated in a second test wherein ethyl alcohol was used in place of acetonitrile. Results were unchanged.

EXAMPLE II

A weighed amount of $TCNQ^O$ (0.12 g)(to maintain the optimum concentration ratio of $[TCNQ^o]/[NMP^+ + TCNQ^-] = 1.15$) was added to 12 ml DMF containing 0.19 g $NMP^+TCNQ^-$ and 0.10 g PC at 30° C. The resulting dark green solution was treated as described in Example I to precipitate a black composite. The conductivity of a compaction disk of this composite was 0.62 $ohm^{-1}$ $cm^{-1}$.

EXAMPLE III

Fifteen ml of DMF dissolved 0.23 g of poly(vinyl butyral) at 30° C. is added with 0.23 g $NMP^+TCNQ^-$. The resulting dark green solution was treated as described in Example I to precipitate a black composite. The conductivity of this composite is 0.21 $ohm^{-1}cm^{-1}$.

EXAMPLE IV

To 15 ml DMF dissolving 0.10 g poly(methylmethacrylate) was added 0.10 g N,N,N-triethylammonium TCNQ complex salt at 30° C. The resulting dark green solution was treated as described in above examples to separate a black composite. The conductivity of this sample gives $7\times10^{-4}$ $ohm^{-1}cm^{-1}$.

EXAMPLE V

To 15 ml DMF dissolving 0.10 g PC is added 0.3 g N-methylacridinium TCNQ complex salt ($NMA^+(TCNQ)_2^-$) at 30° C. The resulting dark green solution was treated as described in above examples to separate a black composite. The conductivity of this sample gives $5\times10^{-2}$ $ohm^{-1}cm^{-1}$.

What is claimed to be desired and secured by Letters Patent of the United States is:

1. A method for producing a moldable composition comprising the following steps:

a. selecting a moldable polymer from the group consisting of polycarbonate, poly(vinyl butyral), and poly(methyl methacrylate) with an ionization potential in the range of 8 eV to 12 eV;

b. selecting as a first liquid a mutual solvent selected from the group consisting of dimethylformamide, dimethylsulfoxide, N,N-dimethylacetamide, tetrahydrofuran, and methylene chloride in which the said polymer and a TCNQ salt species are together soluble;

c. dissolving in said mutual solvent at ambient temperature said moldable polymer together with an amount of said TCNQ salt species sufficient to coat and increase the conductivity of said moldable polymer;

d. obtaining a precipitate by mixing the polymer/TCNQ salt species/mutual solvent solution formed in step (c) into a chilled second liquid selected from the group consisting of acetonitrile and lower alkyl alcohols, miscible with the mutual solvent, in which the TCNQ salt species and the polymer are less soluble; and e. isolating the TCNQ salt species-coated polymer moldable composite product formed in step (d).

2. The method of claim 1 wherein the polymer in said polymer selecting step has an ionization potential in the range of 9 eV to 11 eV.

3. The method of claim 1 wherein the polymer in said polymer selecting step has an ionization potential in the range of 9 eV to 10 eV.

4. The method of claim 1 wherein the polymer in said polymer selecting step is polycarbonate, the mutual solvent in said solvent selecting step is dimethylformamide, and the second liquid a lower alkyl alcohol.

5. The method of claim 1 wherein the polymer in said polymer selecting step is polycarbonate, the solvent in said solvent selecting step is dimethylformamide, and the second liquid is ethanol.

6. The method of claim 3 wherein the polymer in said polymer selecting step is polycarbonate, the solvent in said solvent selecting step is dimethylformamide, and the second liquid is ethanol.

7. The method of claim 1 wherein the TCNQ salt is N-methylphenazinium TCNQ.

8. The method of claim 3 wherein the TCNQ salt is N-methylphenazinium TCNQ.

9. The method of claim 4 wherein the TCNQ salt is N-methylphenazinium TCNQ.

10. The method of claim 6 wherein the TCNQ salt is N-methylphenazinium TCNQ.

11. The method of claim 10 wherein the polycarbonate polymer is Bis-phenol A polycarbonate.

12. In the method of claim 1, the added step of chilling the polymer/TCNQ salt species/mutual solvent solution formed in step (c) prior to adding it to the second liquid in step (d).

13. A composite material containing a polymer selected from the group consisting of polycarbonate, poly(vinyl butyral), and poly(methyl methacrylate) and a TCNQ salt wherein:

the polymers are formed as filaments;

the TCNQ salt is in the form of micro-crystals adhering to each filament; and the filament are in intimate contact with one another such that electrical current may be conducted from TCNQ salt microcrystals on one filament to TCNQ salt microcrystals on an adjacent filament.

14. The material of claim 13 wherein the polymer is Bisphenyl A polycarbonate and the TCNQ salt is N-methylphenazinium TCNQ.

15. The material of claim 13 wherein the cation of the TCNQ salt is an amine.

16. The material of claim 13 wherein the polymer is poly(vinylbutyral) and the TCNQ salt is N-methylphenazinium TCNQ.

17. The material of claim 13 wherein the polymer is poly(methyl methacrylate) and the TCNQ salt is N,N,N-triethylammonium TCNQ.

18. The material of claim 13 wherein the polymer is polycarbonate and the TCNQ salt is N-methylacridinium TCNQ.

19. The material of claim 13 wherein the cation of the TCNQ salt is a heterocyclic, nitrogen-containing aromatic species with a positive formal charge on nitrogen.

* * * * *